Jan. 12, 1960 R. EMEIS 2,921,244

ENCAPSULED SEMICONDUCTOR DEVICE

Filed July 30, 1958

2,921,244
Patented Jan. 12, 1960

2,921,244

ENCAPSULED SEMICONDUCTOR DEVICE

Reimer Emeis, Pretzfeld, Germany, assignor to Siemens-Schuckertwerke Aktiengesellschaft, Berlin-Siemensstadt, Germany, a corporation of Germany Application July 30, 1958, Serial No. 752,101

Claims priority, application Germany August 1, 1957

5 Claims. (Cl. 317—234)

My invention relates to encapsuled electric semi-conductor devices, such as rectifiers, transistors, thermistors or the like, which comprise a monocrystalline body of germanium, silicon or other semiconductor substances, and form one or more p-n junctions of relatively large area.

Encapsulating such devices in a gas-tight housing serves to prevent deleterious effects upon the semiconductor member due to foreign substances contained in the atmosphere, particularly oxygen and moisture. Such foreign constituents may impair the electric properties of the semiconductor devices mainly by causing conducting bridges to form across the p-n boundary where it emerges on the surface of the semiconductor crystal. However, the protection thus afforded is often imperfect even if the capsule is filled with protective gas such as argon or nitrogen. Deleterious gaseous residues may remain within the sealed space when the device is filled with protective gas, or slight leaks may occur in the housing which, though at first not perceptible, may permit deleterious foreign substances to diffuse into the housing during prolonged periods of time.

It is an object of my invention to obviate impairment of such kind, even in cases where detrimental substances may subsequently penetrate into the sealed interior of the capsule.

To this end, and in accordance with a feature of my invention, I provide the interior of the sealed capsule with aluminum getter substance capable of bonding the constituent or constituents that may be contained in the atmosphere within the capsule and are deleterious to the encapsuled semiconductor member.

Oxygen, for example, can thus be bonded by means of an aluminum sheet on whose surface a trace of mercury is located. When placing the mercury onto the aluminum, the oxide skin, usually present, must be penetrated so that the mercury can enter into direct contact with the aluminum; otherwise the oxide skin would prevent the aluminum from performing the desired getter action. The mercury can be placed upon the aluminum either in metallic form or as a compound, for example a salt or sublimate, for example in form of $HgCl_2$.

According to another, more specific feature of my invention, a strip-shaped sheet of aluminum has one end attached to the housing wall of the capsule, for example by soldering. According to another feature, the aluminum may be given the shape of a ring which is fitted into a cylindrical portion of the housing. The provision of a separate aluminum body can be dispensed with if the housing itself, or a portion thereof, consists of aluminum. In this case, it is only necessary to remove the oxide skin from a spot on the inner wall of the housing and to place a trace of mercury upon the cleaned spot.

The aluminum wall or the aluminum body added to the device is preferably amalgamated immediately prior to sealing the capsule. This can be done, for example, with the aid of a silver wire whose pointed end is dipped into mercury and then used for scratching a spot or line on the aluminum surface. In this manner, a sufficient trace of mercury is placed into direct contact with the bare aluminum. The mercury amalgamates with a corresponding quantity of the aluminum so that the aluminum becomes activated in the manner known as such. If the sealed atmosphere within the capsule, which in most cases is not entirely dry, enters into contact with the free surface of amalgam, the oxygen constituent of this atmosphere may result in the formation of aluminum oxide. The aluminum thus taken out of the amalgam replenishes itself from the aluminum base and thus leads to the bonding of a further amount of oxygen while forming aluminum oxide. The process continues automatically until all oxygen from the encapsuled atmosphere is bonded. This process is so effective that even if the gas-tightly sealed capsule originally contains air, a pure nitrogen atmosphere is produced.

The described phenomenon also results in bonding any humidity that may be present in the encapsuled atmosphere, resulting in the formation of basic aluminum oxide. However, for further elimination of moisture, a small quantity of silicic-acid gel, obtainable in the trade under the name "Silicagel," can be placed into the housing, for example in loose condition.

Embodiments of rectifier devices according to the invention are illustrated, by way of example, in the accompanying drawing, in which.

Figure 1:
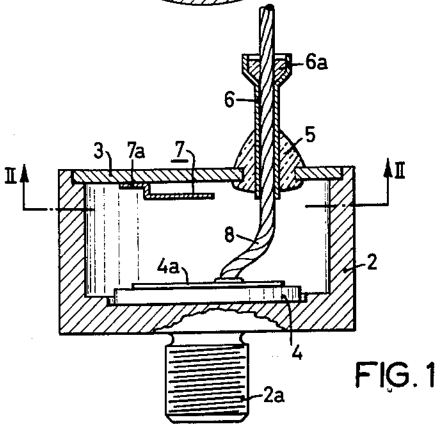
Fig. 1 illustrates a cross-sectional view of a silicon rectifier device.

The device according to Fig. 1 is provided with a circular rectifier element, for example, a silicon rectifier comprising a main body of crystalline p-type silicon and having part of its top surface covered by an antimony-containing gold electrode *4a*. The rectifier element 4 is located on the bottom of a housing 2 of copper with which it is joined by soldering to form a good heat-conducting junction therewith. The lower portion of the housing 2 thus also serves as a connecting contact for a barrier-free metal electrode located on the bottom side of the rectifier element 4 but not visible on the drawing. The lower metal electrode may consist of aluminum. Soldered to the upper electrode *4a* is a conductor 8 consisting preferably of a flexible litzwire of copper whose individual thin wires are silver-coated. The bottom portion of housing 2 is integral with a screw bolt *2a*, also of copper, for fastening the device to a mounting structure. The housing 2 is closed by a cover 3 which has an opening traversed by the conductor 8 and sealed by means of insulating substance such as a glass bead 5. Fused into bead 5 is a metal tube 6 with a funnel portion *6a* at its protruding end. The cover 3 and the metal tube 6 may be made of an iron-nickel cobalt alloy such as available in the trade under the name Fernico. To facilitate soldering, the surface of cover 3 and the inner walls of tube 6 may first be coated with a thin nickel layer for example by electro-plating, and may then be coated with a thin layer of silver.

Figure 2:
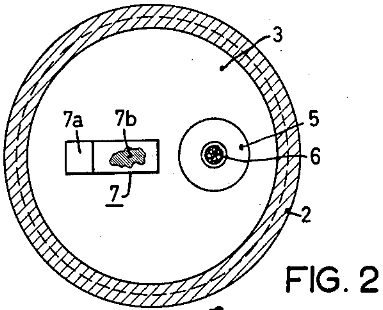
Fig. 2 shows a section of the same device along line II—II in Fig. 1, seen from below.

Fastened to the bottom side of cover 3 by soldering is the angular end *7a* of an aluminum strip 7. Prior to closing the housing, a spot denoted by *7b* in Fig. 2, is amalgamated in the manner described above. Thereafter the conductor 8 is threaded through the tube 6, and the cover 3 is firmly and tightly joined with the housing 2 by soldering. Ultimately, the conductor 8 is sealed together with the tube 6 by filling the funnel portion *6a* with liquid solder.

Figure 3:
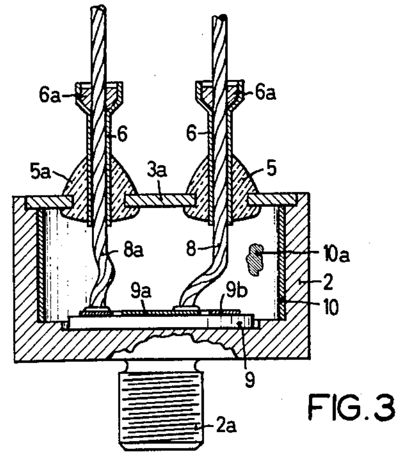
Fig. 3 is a cross-sectional view of a transistor device.

The transistor device according to Fig. 3 has a housing similar to that described with reference to Figs. 1 and 2, identical elements being denoted by the same respective reference characters. The transistor proper consists of a semiconductor body 9 which is fusion-joined on its upper surface with a circular emitter electrode *9a* consisting, for example of antimony-containing gold, and with a ring-shaped basis electrode *9b*, for example of aluminum, which coaxially surrounds the emitter electrode *9a*. A collector electrode, which may also consist of antimony-containing gold, is fusion-joined and thus alloyed together with the bottom side of the semiconductor body 9 and covers this body completely, the latter electrode being not visible on the drawing. The cover *3a* of the housing 2 is provided with two seals 5 and *5a* through which the connecting leads 8 and *8a* of the emitter electrode and basis electrode respectively pass from the outside into the housing. Each connecting conductor is sealed by means of a metal tube 6 and a seal *6a* in the same manner as described with reference to Fig. 1. The inner wall of housing 2 is lined with a thin ring 10 of aluminum which is amalgamated at the location 10*a* in the manner described above.

By virtue of the invention, the semiconductor devices, evacuated or filled with protective gas, are sealed within an enclosed atmosphere of extremely high purity even if deleterious gases are liberated during subsequent use of the device and at first adhere to the inner walls of the capsule or to components built into the capsule. In some cases, the use of a vacuum pump and the filling of the capsule with protective gas may be dispensed with entirely. The invention also affords keeping an enclosed protective gas extremely pure from such deleterious admixtures as oxygen, even if the housing has slight leaks, because any such impurities as may diffuse into the capsule are continuously bonded by the getter substance.

I claim:

1. Electric semiconductor device, comprising a semiconductor member, a capsule enclosing and hermetically sealing said member, and an amount of amalgamated aluminum disposed within said capsule in spaced and insulated relation to said semiconductor member for bonding constituents of the encapsuled atmosphere deleterious to said semiconductor member.

2. Electric semiconductor device, comprising a semiconductor member, a capsule enclosing and hermetically sealing said member, and a body of aluminum having a mercury-containing coating and being disposed within said capsule in spaced and insulated relation to said semiconductor member for bonding constituents of the atmosphere deleterious to said semiconductor member.

3. Electric semiconductor device, comprising a semiconductor member, a capsule enclosing and hermetically sealing said member, and a sheet-metal body of amalgamated aluminum attached to the inner wall of said capsule for bonding constituents of the atmosphere deleterious to said semiconductor member.

4. Electric semiconductor device, comprising a semiconductor member, a capsule enclosing and hermetically sealing said member, said capsule having a cylindrical interior portion, and a ring-shaped body of amalgamated aluminum firmly seated in said cylindrical portion for bonding atmospheric constituents deleterious to semiconductor member.

5. Electric semiconductor device, comprising a semiconductor member, a capsule enclosing and hermetically sealing said member, said capsule having a wall portion consisting of aluminum and said wall portion having a mercury-containing coating on its inner side for bonding constituents of the encapsuled atmosphere deleterious to said semiconductor member.

References Cited in the file of this patent

UNITED STATES PATENTS

| | | |
|---|---|---|
| 2,664,528 | Stelmak | Dec. 29, 1953 |
| 2,858,356 | Setchell | Oct. 28, 1958 |